United States Patent [19]

Agano et al.

[11] Patent Number: 4,818,876
[45] Date of Patent: * Apr. 4, 1989

[54] IMAGE READ-OUT APPARATUS EMPLOYING A PHOTOMULTIPLIER

[75] Inventors: Toshitaka Agano; Yoshimi Takasaki, both of Kanagawa, Japan

[73] Assignee: Fuji Photo Film Co., Ltd., Kanagawa, Japan

[*] Notice: The portion of the term of this patent subsequent to Aug. 18, 2004 has been disclaimed.

[21] Appl. No.: 741,407

[22] Filed: Jun. 5, 1985

[30] Foreign Application Priority Data

Jun. 6, 1984 [JP] Japan ................... 59-116105

[51] Int. Cl.$^4$ ............................................. G01T 1/115
[52] U.S. Cl. ........................... 250/484.1; 250/327.2
[58] Field of Search ............... 250/327.2, 484.1, 337; 358/294

[56] References Cited

U.S. PATENT DOCUMENTS 4,125,330 11/1978 Schild ................... 356/416
4,258,264 3/1981 Kotera et al. ............ 250/484.1
4,346,295 8/1982 Tanaka et al. ............ 250/327.2

FOREIGN PATENT DOCUMENTS 0011395 2/1981 Japan ................... 250/327.2

Primary Examiner—Janice A. Howell
Assistant Examiner—Constantine Hannaher
Attorney, Agent, or Firm—Sughrue, Mion, Zinn, Macpeak & Seas

[57] ABSTRACT

An image read-out apparatus for exposing a recording medium carrying an image stored therein to a light beam, and photoelectrically detecting light carrying the image information obtained from the recording medium by use of a photomultiplier comprises a comparator for comparing an output current signal of the photomultiplier with a predetermined reference value, and a voltage detector for detecting the voltage generated at a bleeder resistor of the photomultiplier. The apparatus also comprises a selection circuit for receiving the output current signal of the photomultiplier, a voltage signal detected by the voltage detector, and an output of the comparator, selecting the output current signal of the photomultiplier when the output current signal of the photomultiplier is equal to or lower than the reference value, and selecting the voltage signal when the output current signal of the photomultiplier is higher than the reference value.

9 Claims, 3 Drawing Sheets

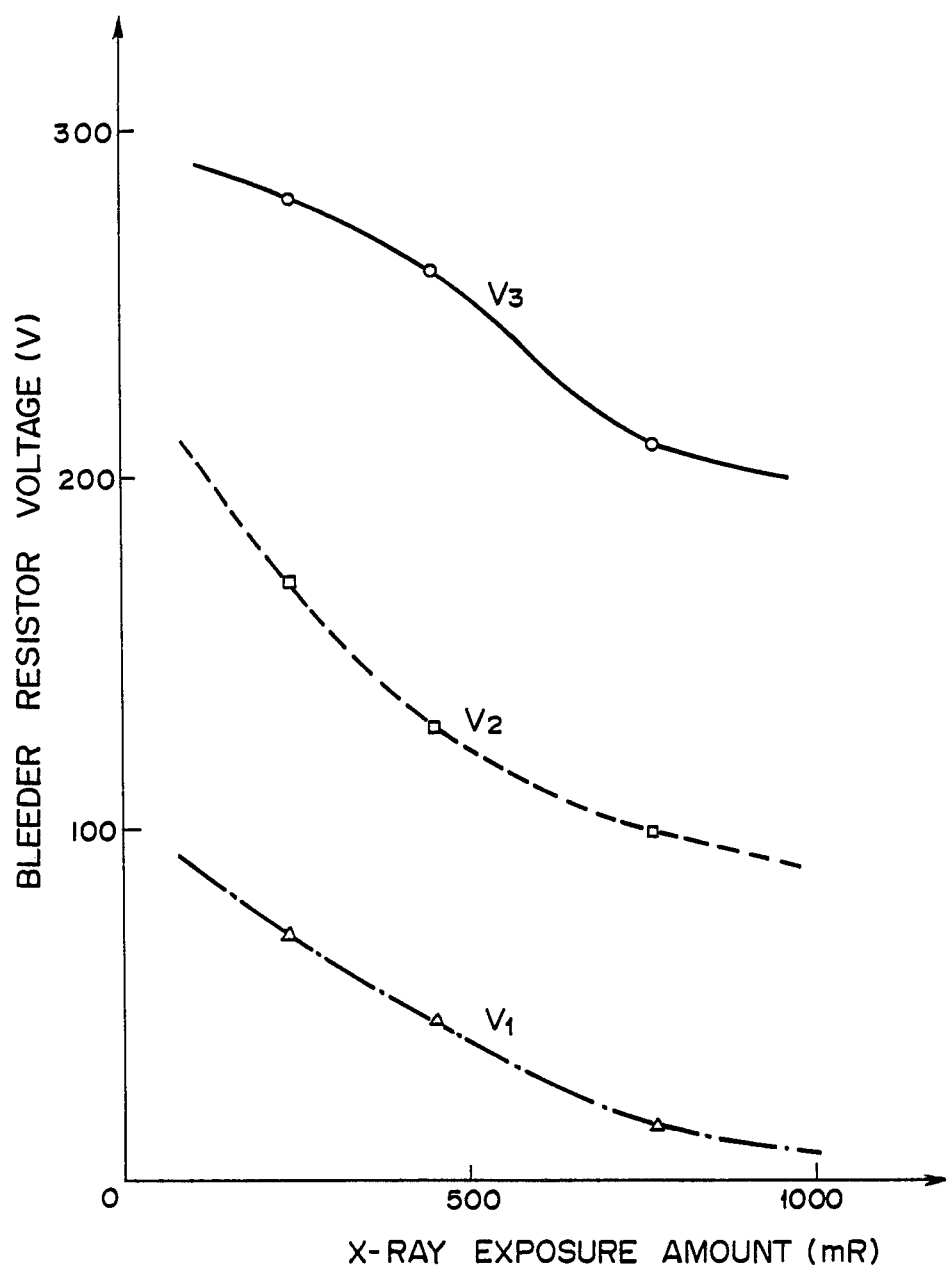
F I G. 1

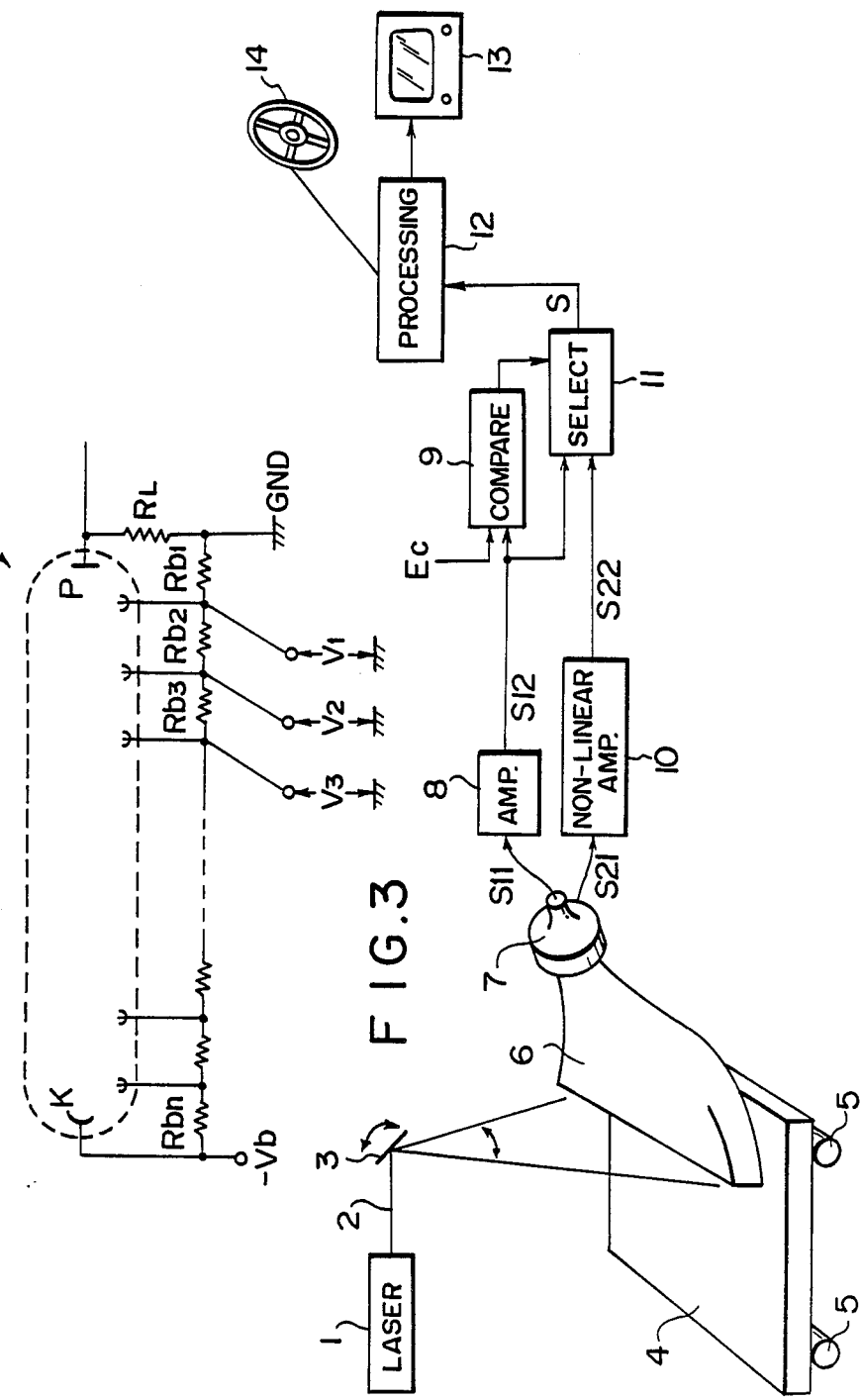

IMAGE READ-OUT APPARATUS EMPLOYING A PHOTOMULTIPLIER

BACKGROUND OF THE INVENTION

1. Field of the Invention

This invention relates to an image read-out apparatus for photoelectrically detecting light carrying image information by use of a photomultiplier.

2. Description of the Prior Art

In general, photomultipliers are widely used in image read-out apparatuses for reading out an image by exposing a recording medium carrying the image stored therein to a light beam and by detecting light reflected by the recording medium, or light transmitted therethrough, or light emitted thereby.

The image read-out apparatus using a photomultiplier is employed, for example, in an input apparatus of a computer and an image read-out apparatus of a facsimile. In the apparatus, image read-out is specifically carried out as described below.

A recording medium carrying an image constituted by a density pattern stored therein, i.e. an original, is two-dimensionally scanned by a light beam. Light reflected by the original (in the case where the original is a paper original) or transmitted therethrough (in the case where the original is a film original) is detected and converted into a serial electric image signal by a photomultiplier. In this manner, the image recorded on the original is read out. The electric image signal thus obtained is subjected to various processings, for example, transfer to a remote station via a transfer system, an image processing, and storing in a magnetic recording medium.

Image read-out using a photomultiplier is conducted also in a radiation image recording and reproducing system using a stimulable phosphor sheet as disclosed, for example, in U.S. Pat. No. 4,258,264 and Japanese Unexamined Patent Publication No. 56(1981)-11395. In this case, a stimulable phosphor sheet carrying a radiation image stored therein is exposed to stimulating rays which cause it to emit light in proportion to the stored radiation energy, and the emitted light is detected photoelectrically.

The "stimulable phosphor" referred to in this invention means a phosphor which is able to store radiation energy therein upon exposure to a radiation such as X-rays, $\alpha$-rays, $\beta$-rays, $\gamma$-rays, cathode rays or ultraviolet rays, and then emit light in proportion to the stored energy of the radiation upon stimulation with stimulating rays such as visible light.

In the radiation image recording and reproducing system using a stimulable phosphor sheet, image read-out is specifically carried out as described below.

A stimulable phosphor sheet carrying a radiation image stored therein by being exposed to a radiation such as X-rays via an object such as the human body is two-dimensionally scanned by stimulating rays such as a laser beam which cause it to emit light in proportion to the stored radiation energy. The emitted light is detected and converted into an electric image signal by a photomultiplier. In this manner, the radiation image is read out. On the basis of the electric image signal, a visible image is reproduced on a recording material such as a photographic film or on a display device such as a cathode ray tube (CRT).

In the image read-out apparatus using a photomultiplier, image read-out is normally conducted by adjusting the read-out gain of the photomultiplier to suit a desired image read-out range. However, when images are read out from recording media carrying various images stored therein, the intensity of light carrying the image information which should be read out is not necessarily within the desired image read-out range, and often goes beyond the desired image read-out range. In such a case, the output current of the photomultiplier for reading out the image does not accurately correspond to the intensity of light incident on the photomultiplier. That is, the output current of the photomultiplier does not change with sufficient sensitivity to small changes in the intensity of light incident on the photomultiplier, and it is not always possible to accurately detect the image.

SUMMARY OF THE INVENTION

The primary object of the present invention is to provide an image read-out apparatus which accurately reads out an image by exposing a recording medium carrying the image stored therein to a light beam, and detecting light obtained thereby from the recording medium by use of a photomultiplier.

Another object of the present invention is to provide an image read-out apparatus which accurately reads out an image from a recording medium carrying the image stored therein by use of a photomultiplier even when the intensity of light carrying the image information changes over a wide range.

The inventors conducted experiments for accomplishing the above objects and found that, even after the output current of the image read-out photomultiplier approaches the saturated condition and the increase of the output current with respect to the increase in the incident light intensity gradually becomes small, the voltage generated at a bleeder resistor of the photomultiplier decreases with sufficient sensitivity as the incident light intensity increases.

The aforesaid finding will be described in detail with reference to the accompanying drawings. FIG. 1 is a graph showing the relationship between the X-ray exposure amount used for solid image recording on a stimulable phosphor sheet and the voltage generated at the bleeder resistor of a photomultiplier (hereinafter referred to as the bleeder resistor voltage) as measured when the stimulable phosphor sheet carrying the solid X-ray image stored therein is exposed to stimulating rays and light emitted by the sheet is detected by the photomultiplier. The photomultiplier used had a configuration as schematically shown in FIG. 2. Measurement of bleeder resistor voltages V1, V2 and V3 was conducted on bleeder resistors Rb1, Rb2 and Rb3 (56k$\Omega$ each) positioned in this order from the plate P side to the cathode K side of a photomultiplier 50.

The gain of the photomultiplier 50 is adjusted to suit the detection of light emitted by the stimulable phosphor sheet carrying an X-ray image of an object such as the human body. X-ray image recording for the human body or the like is normally conducted at 100 mR or less. In the case where the gain of the photomultiplier 50 is adjusted to suit the normal X-ray image recording and X-ray image recording is conducted by use of an exposure amount larger than the normal X-ray exposure amount, when the photomultiplier 50 detects a solid image portion of the X-ray image, the output current of the photomultiplier 50 goes to or approaches the saturated condition and the residual radiation energy level at the solid image portion cannot be measured accurately. However, as shown in FIG. 1, it was found that the bleeder resistor voltage decreases with sufficient sensitivity to an increase in the X-ray exposure amount, i.e. to an increase in light emission amount of the stimulable phosphor sheet detected by the photomultiplier 50, over a sufficiently wide range of the X-ray exposure amount exceeding the normal X-ray exposure amount without approaching the saturated condition.

In the present invention, on the basis of the novel finding described above, the aforesaid objects are accomplished by measuring the bleeder resistor voltage in the photomultiplier in the case where the intensity of light carrying the image information which should be read out is comparatively high, i.e. when the output current of the photomultiplier nearly goes to the saturated condition.

The present invention provides an image read-out apparatus for exposing a recording medium carrying an image stored therein to a light beam, and photoelectrically detecting light carrying the image information obtained from the recording medium by use of a photomultiplier, the image read-out apparatus comprising:

(i) a comparison means for comparing the output current signal of said photomultiplier with a predetermined reference value, (ii) a voltage detection means for detecting the voltage generated at a bleeder resistor of said photomultiplier, and (iii) a selection circuit for receiving the output current signal of said photomultiplier, a voltage signal detected by said voltage detection means, and the output of said comparison means, selecting the output current signal of said photomultiplier when the output current signal of said photomultiplier is equal to or lower than said reference value, and selecting said voltage signal when the output current signal of said photomultiplier is higher than said reference value.

In the image read-out apparatus of the present invention, when the output current of the photomultiplier used for image read-out goes nearly to the saturated condition and does not change with sufficient sensitivity to a small change in intensity of light incident on the photomultiplier, light carrying the image information is read out by switching over to detect the bleeder resistor voltage of the photomultiplier. Therefore, it is possible to accurately read out the image even when the intensity of light carrying the image information changes over a wide range.

As the predetermined reference value used in the comparison means, it is possible to select any value representing an output current of the photomultiplier within such a range that the output current of the photomultiplier is sufficiently sensitive to a small change in intensity of light incident on the photomultiplier. The predetermined reference value should preferably be selected from values representing an output current within such a range that the output current approximately linearly changes with respect to the intensity of light incident on the photomultiplier, and should more preferably be selected from values representing an output current within such a range that the absolute value of the gradient of the curve indicating a change in output current of the photomultiplier with respect to the intensity of light incident on the photomultiplier is equal to the absolute value of the gradient of the curve indicating a change in bleeder resistor voltage of the photomultiplier with respect to the intensity of light incident on the photomultiplier.

BRIEF DESCRIPTION OF THE DRAWINGS

FIG. 1 is a graph showing the relationship between the X-ray exposure amount of a stimulable phosphor sheet and the voltage generated at a bleeder resistor of a photomultiplier when the stimulable phosphor sheet is exposed to stimulating rays and light emitted by the sheet is detected by the photomultiplier, FIG. 2 is a schematic view showing the configuration of the photomultiplier used in the image readout apparatus in accordance with the present invention, FIG. 3 is a schematic view showing an embodiment of the image read-out apparatus in accordance with the present invention.

DESCRIPTION OF THE PREFERRED EMBODIMENTS

Figure 4:
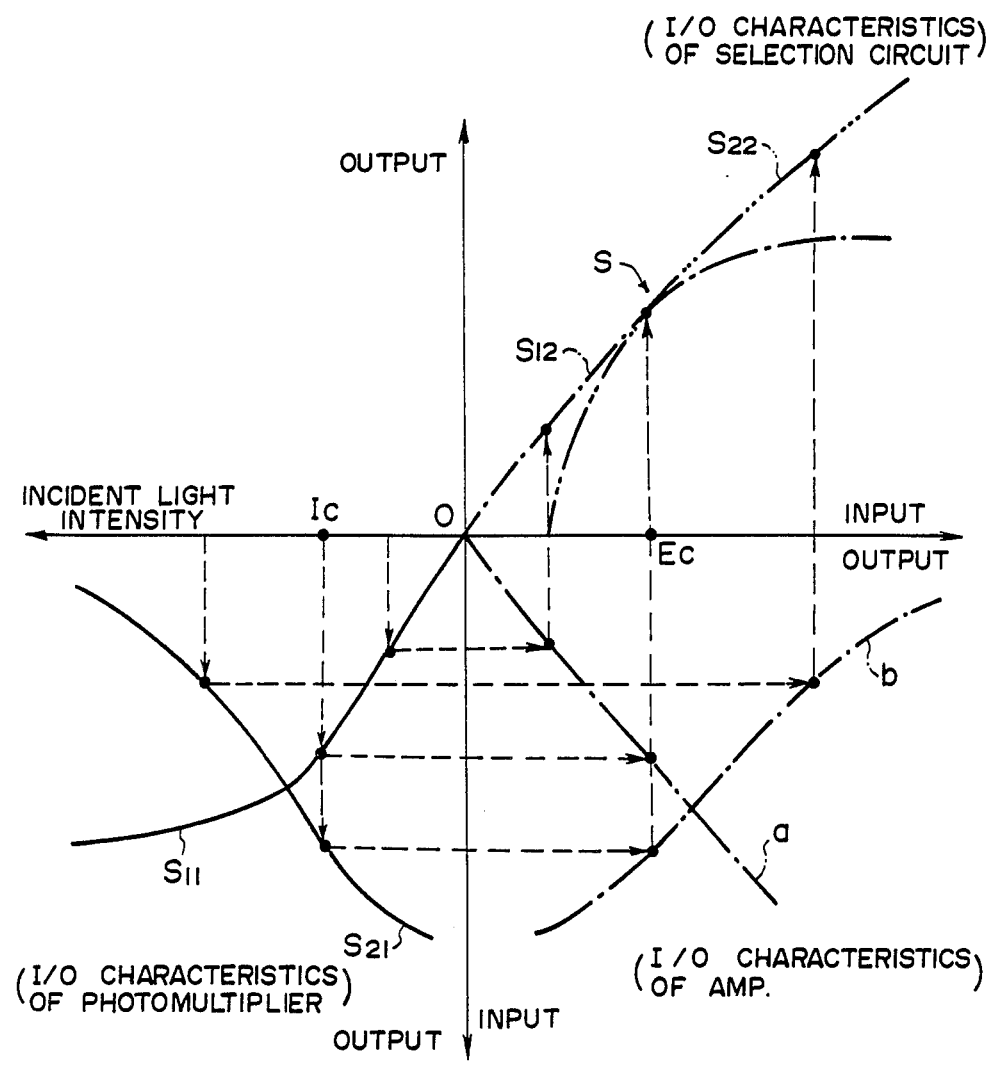
FIG. 4 is a graph showing the input and output characteristics of the photomultiplier, amplifier and selection circuit in the embodiment of FIG. 3.

The present invention will hereinbelow be described in further detail with reference to the accompanying drawings.

FIG. 3 schematically shows an embodiment of the image read-out apparatus in accordance with the present invention, wherein a stimulable phosphor sheet is used as the recording medium carrying an image stored therein. A laser beam source 1 emits a laser beam 2, and a light deflector 3 constituted by a galvanometer mirror or the like is positioned on the optical path of the laser beam 2 for one-dimensionally deflecting the laser beam 2 and making it impinge upon a stimulable phosphor sheet 4 carrying a radiation image stored therein. The stimulable phosphor sheet 4 is moved at a predetermined speed by conveying rollers 5, so that the whole surface of the sheet 4 is exposed to the laser beam 2. When the stimulable phosphor sheet 4 is exposed to the laser beam 2, it emits light in proportion to the stored radiation energy, and the emitted light enters a light guide member 6. The light guide member 6 has a linear light input face positioned close to the scanning line on the stimulable phosphor sheet 4, and a ring-shaped light output face in close contact with the light receiving face of a photomultiplier 7 used as the photodetector. The light guide member 6 is made of a transparent thermoplastic resin sheet such as an acrylic resin sheet so that the light entering from the light input face can be guided to the light output face by total reflection inside of the light guide member 6. The light guide member 6 may be of a shape and a material as disclosed in U.S. Pat. No. 4,346,295 and may be manufactured by use of a method disclosed therein.

The photomultiplier 7 may, for example, be a photomultiplier having S-11 type spectral sensitivity. The light receiving face of the photomultiplier 7 is provided with a filter (not shown) for selectively transmitting the light having a special wavelength distribution and cutting off the light having the wavelength distribution of stimulating rays, so that the photomultiplier 7 can detect only the light emitted by the stimulable phosphor sheet 4 at a high signal-to-noise ratio. An output current signal S11 of the photomultiplier 7 is input to an amplifier 8, and an output signal S12 of the amplifier 8 is input to a comparator 9 which compares the output signal S12 of the amplifier 8 with a predetermined reference signal Ec. On the other hand, a bleeder resistor voltage signal S21 representing the voltage generated at a predetermined bleeder resistor of the photomultiplier 7 is sent to a non-linear amplifier 10. As the predetermined bleeder resistor, there should preferably be selected the one exhibiting the largest change in bleeder resistor voltage among a plurality of the bleeder resistors. Then, an output signal S22 of the non-linear amplifier 10 and the output signal S12 of the amplifier 8 are sent to a selection circuit 11. The selection circuit 11 also receives a signal representing the result of comparison conducted by the comparator 9, selects one or the other of the output signal S21 of the amplifier 8 and the output signal S22 of the non-linear amplifier 10 on the basis of the signal fed by the comparator 9, and generates an output signal S.

Input and output characteristics of the photomultiplier 7, the amplifier 8, the non-linear amplifier 10 and the selection circuit 11 will now be described below with reference to FIG. 4.

Curve S11 represents the output current signal of the photomultiplier 7 which is output in accordance with the intensity of light incident on the photomultiplier 7. The output of the photomultiplier 7 saturates gradually when the incident light amount becomes equal to Ic or more. Curve S21 represents the output voltage level of the bleeder resistor of the photomultiplier 7 which is detected in accordance with the intensity of light incident on the photomultiplier 7. Even when the incident light amount becomes equal to Ic or more, the output voltage level of the bleeder resistor decreases approximately linearly without being saturated. On the other hand, the amplifier 8 exhibits the input and output characteristics as indicated by straight line a, and the non-linear amplifier 10 exhibits the input and output characteristics as indicated by curve b. Straight line S represents the input and output characteristics of the selection circuit 11, and is formed by combining a nearly straight line portion of curve S12 representing the output of the amplifier 8 corresponding to the output signal S11 of the photomultiplier 7 with a nearly straight line portion of curve S22 representing the output of the non-linear amplifier 10 corresponding to the output signal S21 representing the output voltage level of the bleeder resistor of the photomultiplier 7.

Therefore, as the output signal S of the selection circuit 11 in the aforesaid embodiment, the signal S12 obtained by amplifying the output signal S11 of the photomultiplier 7 by the amplifier 8 is output when the intensity of the light incident on the photomultiplier 7 is Ic or less, and the signal S22 obtained by amplifying the output signal S21 representing the output voltage level of the bleeder resistor of the photomultiplier 7 by the non-linear amplifier 10 is output when the intensity of light incident on the photomultiplier 7 is higher than Ic.

As shown in FIG. 3, the output signal S of the selection circuit 11 representing the radiation image detected by the photomultiplier 7 is processed appropriately by an image processing circuit 12, and the processed signal is used for reproducing a visible image on a CRT 13 or as a hard copy on a photographic film, or is stored in a magnetic tape 14.

The embodiment of the image read-out apparatus in accordance with the present invention is described above by taking the radiation image read-out apparatus using a stimulable phosphor sheet as an example. However, it should be understood that the present invention is applicable to any image read-out apparatus regardless of the type of the recording medium insofar as an image is read out by use of a photomultiplier.

We claim:

1. An image read-out apparatus for exposing a recording medium carrying an image stored therein to a light beam, and photoelectrically detecting light carrying the image information obtained from the recording medium by use of a photomultiplier, the image read-out apparatus comprising:
(i) a comparison means for comparing the output current signal of said photomultiplier with a predetermined reference value,
(ii) a voltage detection means for detecting the voltage generated at a bleeder resistor of said photomultiplier, and
(iii) a selection circuit for receiving the output current signal of said photomultiplier, a voltage signal detected by said voltage detection means, and the output of said comparison means, selecting the output current signal of said photomultiplier when the output current signal of said photomultiplier is equal to or lower than said reference value, and selecting said voltage signal when the output current signal of said photomultiplier is higher than said reference value.

2. An apparatus ad defined in claim 1 wherein said predetermined reference value is selected from values representing an output current of said photomultiplier within such a range that the output current approximately linearly changes with respect to the intensity of light incident on said photomultiplier.

3. An apparatus as defined in claim 1 wherein said predetermined reference value is selected from values representing an output current of said photomultiplier within such a range that the absolute value of the gradient of a curve indicating a change in the output current with respect to the intensity of light incident on said photomultiplier is equal to the absolute value of the gradient of a curve indicating a change in bleeder resistor voltage of said photomultiplier with respect to the intensity of light incident on said photomultiplier.

4. An apparatus as defined in claim 1 wherein said recording medium is a stimulable phosphor sheet, and said image is a radiation image.

5. An apparatus as defined in claim 1 wherein said light beam is a laser beam.

6. An apparatus as defined in claim 2 wherein said recording medium is a stimulable phosphor sheet, and said image is a radiation image.

7. An apparatus as defined in claim 2 wherein said light beam is a laser beam.

8. An apparatus as defined in claim 3 wherein said recording medium is a stimulable phosphor sheet, and said image is a radiation image.

9. An apparatus as defined in claim 3 wherein said light beam is a laser beam.

* * * * *